(12) United States Patent
Moskowitz et al.

(10) Patent No.: US 7,944,151 B2
(45) Date of Patent: May 17, 2011

(54) FREQUENCY MODULATION METHOD AND DEVICE FOR HIGH INTENSITY DISCHARGE LAMP

(75) Inventors: Warren Moskowitz, Ipswich, MA (US); Joachim Muehlschlegel, Groebenzell (DE)

(73) Assignee: OSRAM SYLVANIA Inc., Danvers, MA (US)

( * ) Notice: Subject to any disclaimer, the term of this patent is extended or adjusted under 35 U.S.C. 154(b) by 48 days.

(21) Appl. No.: 11/665,002

(22) PCT Filed: Sep. 20, 2005

(86) PCT No.: PCT/US2005/033478
§ 371 (c)(1),
(2), (4) Date: Oct. 29, 2008

(87) PCT Pub. No.: WO2006/044091
PCT Pub. Date: Apr. 27, 2006

(65) Prior Publication Data
US 2009/0051297 A1 Feb. 26, 2009

Related U.S. Application Data

(60) Provisional application No. 60/618,397, filed on Oct. 13, 2004.

(51) Int. Cl.
*H05B 41/16* (2006.01)
(52) U.S. Cl. .................. 315/274; 315/247; 315/209 R; 315/224; 315/291
(58) Field of Classification Search .................. 315/194, 315/199, 209 R, 224, 219, 225, 246, 259, 315/267, 274, 275, 282, 284, 287, 291, 307
See application file for complete search history.

(56) References Cited

U.S. PATENT DOCUMENTS

| 2,429,162 | A | | 10/1947 | Keiser et al. | |
|---|---|---|---|---|---|
| 5,121,034 | A | | 6/1992 | Allen et al. | |
| 5,932,976 | A | * | 8/1999 | Maheshwari et al. | 315/291 |
| 6,788,007 | B2 | | 9/2004 | Kramer | |
| 2005/0127847 | A1 | * | 6/2005 | Lin | 315/194 |

FOREIGN PATENT DOCUMENTS

GB 2 038 571 A 7/1980

OTHER PUBLICATIONS

Extended European Search Report for EP Application No. 05 79 8394, Complete Jul. 13, 2010, The Hague, pp. 1-7.

* cited by examiner

*Primary Examiner* — Tuyet Thi Vo
(74) *Attorney, Agent, or Firm* — Shaun P. Montana (57) ABSTRACT

An electronic control gear for a HID lamp receives an input signal for operating the lamp and frequency modulates the input signal to generate a frequency modulated output signal that drives an arc of the lamp. The frequency modulation of the output signal sweeps continuously between a low frequency modulation and a high frequency modulation, the low frequency modulation being a frequency f1 in a range of 125 kHz to 150 kHz and the high frequency modulation being a frequency f2 in a range of 230 kHz to 300 kHz, where f2-f1 is at least 0.4*f1. A power amplifier changes an amplitude of the frequency modulated output signal during the low frequency modulations so that a current amplitude of the frequency modulated output signal is substantially constant, and a variable gain transformer adjusts a voltage of the frequency modulated output signal during starting of the lamp.

10 Claims, 7 Drawing Sheets

FREQUENCY MODULATION METHOD AND DEVICE FOR HIGH INTENSITY DISCHARGE LAMP

BACKGROUND OF THE INVENTION

The present invention is directed to a method and device that frequency modulates an input signal that operates a high intensity discharge (HID) lamp to thereby generate a frequency modulated output signal that drives an arc of the lamp.

An arc of a HID lamp may be driven with a high frequency signal; that is, a signal whose current is generally sinusoidal or triangular and has a frequency in the range of about 100 kHz to 300 kHz with no, or nearly no, DC component in the current. A high frequency signal for driving an HID lamp is desirable because such signals may be generated with components that are generally smaller and cheaper than those that generate lower frequency signals. However, high frequency signals are accompanied by acoustic resonance phenomena that appear strongly in HID lamps.

Frequency modulation of the signal that drives the arc of the lamp is a known technique for at least partially avoiding acoustic resonance when an HID lamp is driven with a high frequency signal. Modulation methods and devices tend to be complicated and costly, especially when attempting to develop a device that is useful in various HID lamps. Acoustic resonance frequencies vary from lamp to lamp and within a lamp depending on lamp temperature.

SUMMARY OF THE INVENTION

Accordingly, an object of the present invention is to provide a novel device and method for frequency modulation of a signal that drives an arc of a HID lamp and avoids the problems of the prior art.

A further object of the present invention is to provide a novel device and method in which the frequency modulation of the signal sweeps continuously between a low frequency modulation and a high frequency modulation, and more particularly where the low frequency modulation is a frequency f1 in a range of 125 kHz to 150 kHz and the high frequency modulation is a frequency f2 in a range of 230 kHz to 300 kHz, where f2-f1 is at least 0.4*f1.

A yet further object of the present invention is to provide a novel electronic control gear (ECG) for an HID lamp and method of operating the HID lamp in which the frequency modulation of the signal sweeps continuously between a low frequency modulation and a high frequency modulation, a power amplifier changes an amplitude of the frequency modulated signal during the low frequency modulations so that a current amplitude of the frequency modulated signal is substantially constant, and a variable gain transformer adjusts a voltage of the frequency modulated signal during starting of the lamp.

These and other objects and advantages of the invention will be apparent to those of skill in the art of the present invention after consideration of the following drawings and description of preferred embodiments.

DESCRIPTION OF PREFERRED EMBODIMENTS

The method and device of the present invention spread a frequency spectrum of the lamp current over a wide range of frequencies so as to achieve a better, and desirably nearly equal, distribution of frequencies over the wide range. By so doing, the method and device decrease a magnitude of the frequency spectrum to a level low enough to avoid exciting acoustic resonance. For example, acoustic resonance at a frequency is avoided when a spectral content at that frequency is less than about 1%, when measured as a ratio of spectral power distribution (SPD; also known as power spectral density—PSD)

Figure 6:
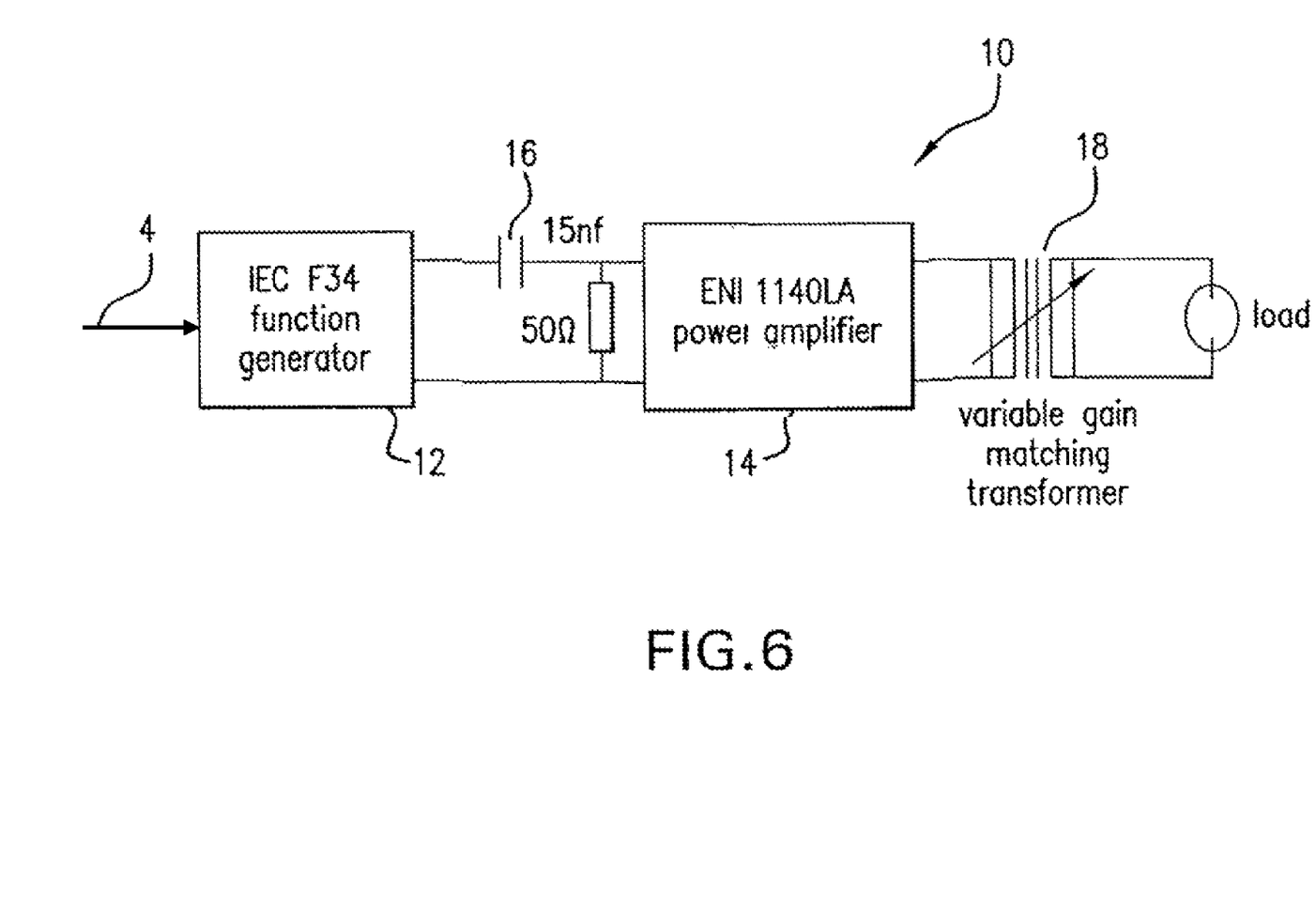
FIG. 6 is a schematic representation of an embodiment of a device of the present invention.

The method and device frequency modulate an input signal, such as the input signal 4 shown in FIG. 6, that operates the lamp (shown as the load in FIG. 6) to generate a frequency modulated output signal that drives the arc of the lamp and whose frequency modulation sweeps continuously between a low frequency modulation and a high frequency modulation. By sweeping the frequency of modulation between two particular modulation frequencies, the magnitude of the frequency spectrum between those particular modulation frequencies is reduced to a level low enough to avoid exciting acoustic resonance.

In one embodiment, the low frequency modulation is a frequency f1 in a range of about 125 kHz to 150 kHz and the high frequency modulation is a frequency f2 in a range of about 230 kHz to 300 kHz, where f2 minus f1 is at least 0.4 times f1. The magnitude of the frequency spectrum between f1 and f2 is low enough to avoid exciting acoustic resonance.

Figure 1A:
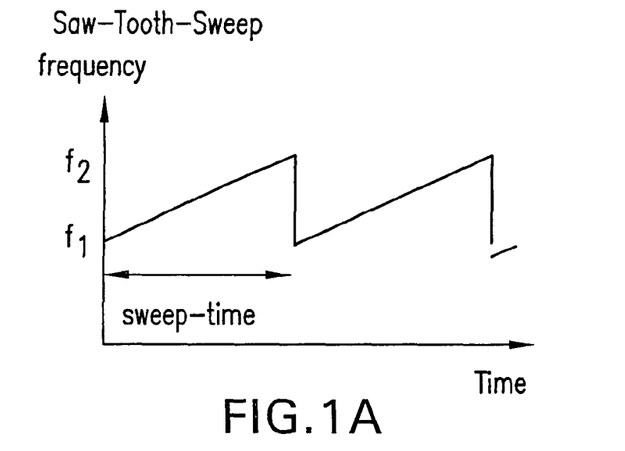
FIGS. 1A-C show frequency versus time plots for various frequency modulation sweeps of the present invention.
Figure 1B:
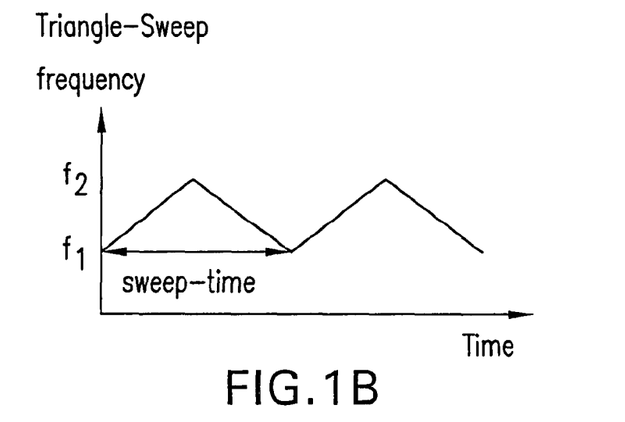
Figure 1C:
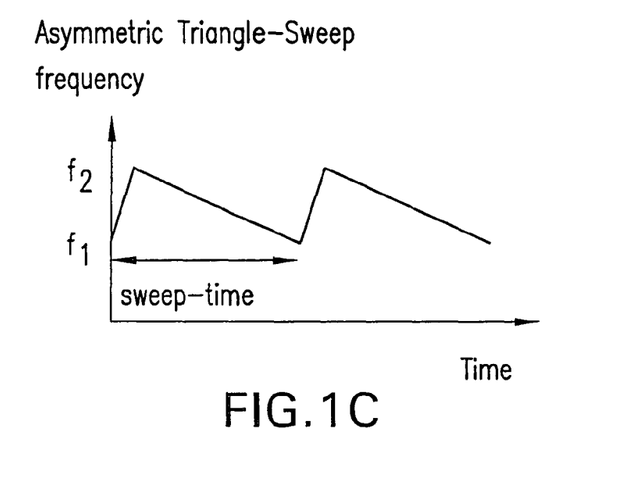

A preferred technique for decreasing a magnitude of the frequency spectrum to a level low enough to avoid exciting acoustic resonance is to hold the current amplitude constant, or nearly so, and to sweep the frequency of the frequency modulation more or less linearly from the frequency of the low frequency modulation to the frequency of the high frequency modulation. This provides a saw tooth or triangular pattern such as shown in FIGS. 1A-C. As shown therein, the pattern may be symmetric or asymmetric. The sweep may deviate slightly from linear to provide a more constant current amplitude so as to achieve a more nearly constant output power from the device.

The high and low frequency modulation frequencies should be selected to avoid a visible flicker in the arc. To this end, the low frequency modulation is a frequency f1 in a range of about 125 kHz to 150 kHz and the high frequency modulation is a frequency f2 in a range of about 230 kHz to 300 kHz. The sweep time (time from the low frequency modulation to the high frequency modulation and back to the low frequency modulation) is about 2-20 ms.

More particularly, f1 may be one of 125 kHz, 130 kHz, and 135 kHz, f2 may be one of 230 kHz, 240 kHz, and 250 kHz, and the sweep time may be one of 8.33 ms and 10 ms. Alternatively, f1 may be 100 kHz, f2 may be one of 140 kHz and 150 kHz, and the sweep time may be one of 8.33 ms and 10 ms. In tests, lamps swept with a lower frequency modulation at 100 kHz or below or above 150 kHz (and 250 kHz high frequency modulation) had arcs that did not appear to be as stable (the arc moved around in the burner) as those of lamps that were swept with a lower frequency modulation in the range of 125 kHz to 150 kHz. The frequency of the high frequency modulation produced satisfactory results in the range of 230 kHz to 300 kHz (frequencies higher than 300 kHz were not tested). Sweep times were also investigated. Slow sweeps caused a visual oscillation in the light amplitude perhaps due to a small frequency dependent variation in burner power, however there did not appear to be an associated arc instability. Long sweep times, such as 30 ms produced an annoying flicker, while sweep times from 2 ms to 15 ms did not produce a visual arc disturbance.

Figure 2A:
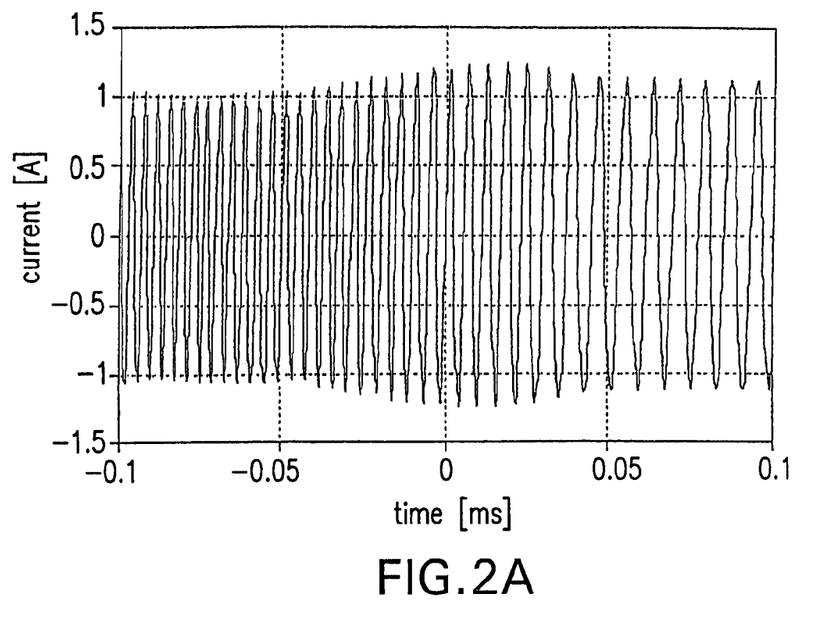
FIGS. 2A-B show current and voltage versus time for an embodiment of the present invention and FIG. 2C is a combination of FIGS. 2A-B.
Figure 2B:
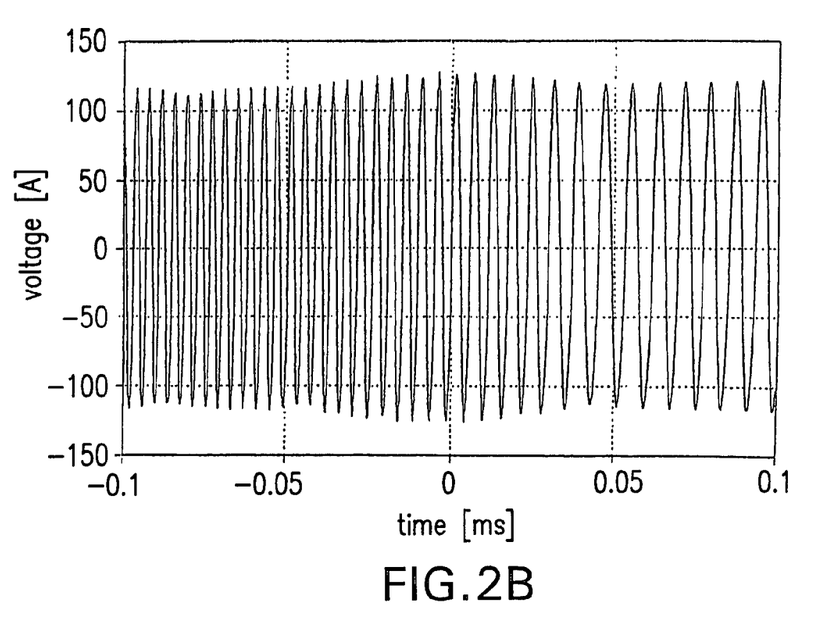

The lamps investigated were one sample of each of the following: Philips CDM-R 70 W/830 PAR 30, Sylvania MPD70 PAR 30, and OSRAM Powerball HCI-T 70 W/WDL. FIGS. 2A and 2B show the current and voltage waveforms, respectively, at the end of a sweep during the rapid (~0.06 ms) return from 250 kHz back to 125 kHz (e.g., as in FIG. 1A). These waveforms were acquired for the Powerball lamp. The upward portion of the linear frequency ramp took 10 ms. The current and voltage are essentially identical sine waves that lie right on top of each other—that is to say: identical except for a scaling factor of 100 V/A as seen by comparing the left and right scales in FIG. 2C.

Figure 3:
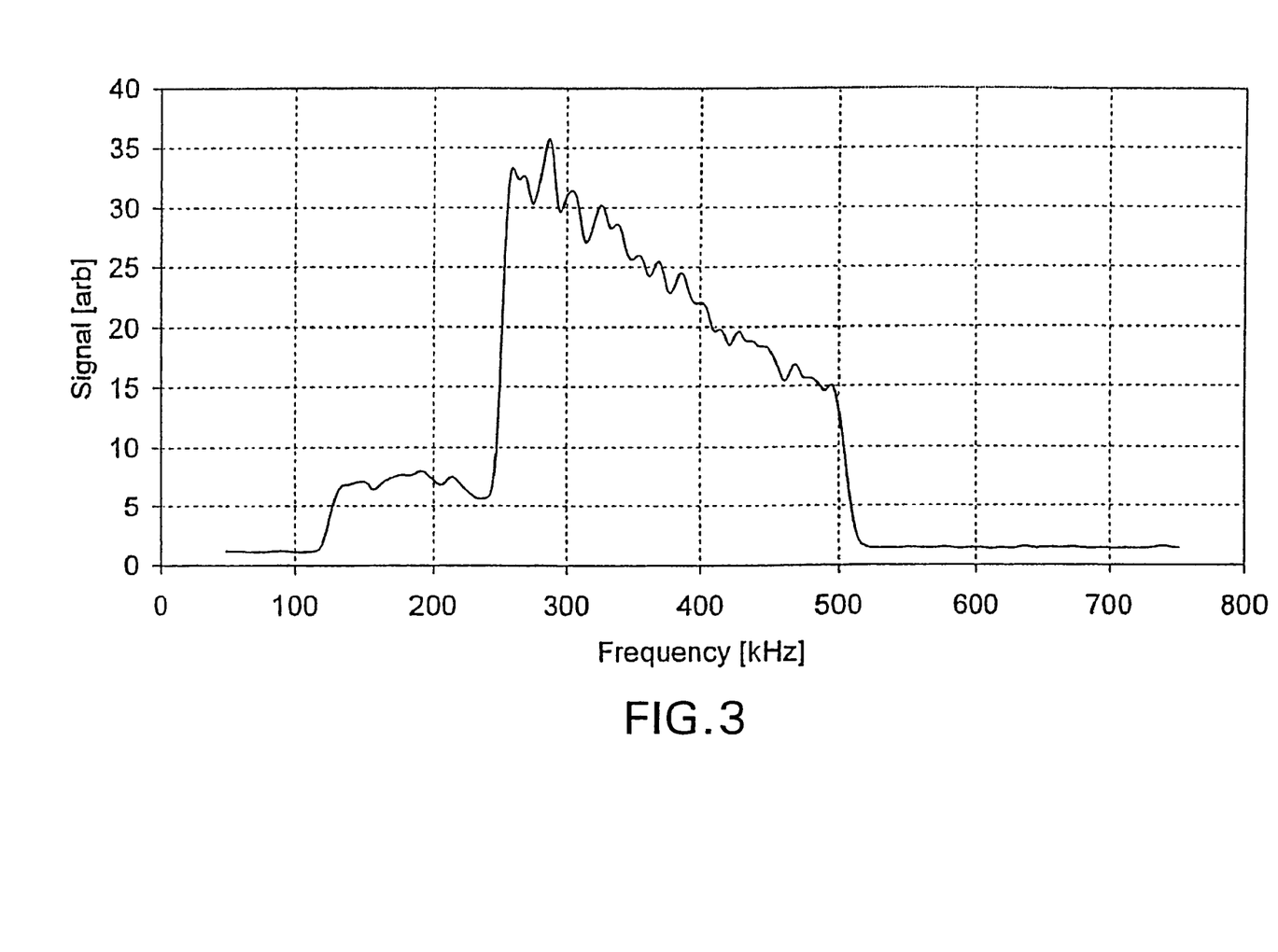
FIG. 3 is a plot of a frequency spectrum of an embodiment of the present invention.

The signal from a photodiode, which was illuminated by an OSRAM Powerball HCI-T 70 W/WDL, lamp, was analyzed by a Fourier transform signal analyzer. FIG. 3 shows the resulting spectrum wherein the lamp power is mostly at twice the frequency of the lamp voltage, or current—in this case, sweeping from 250 kHz to 500 kHz. A small signal appears in the 125 kHz to 250 kHz range owing to asymmetries in the plasma. The slope of the signal is due to thermal inertia in the plasma and capacitance in the photodiode. The lamp was powered by HF swept from 125 kHz to 250 kHz in 10 ms. The arc appeared stable under these conditions. This plot shows an average over 200 acquired spectra.

Figure 4:
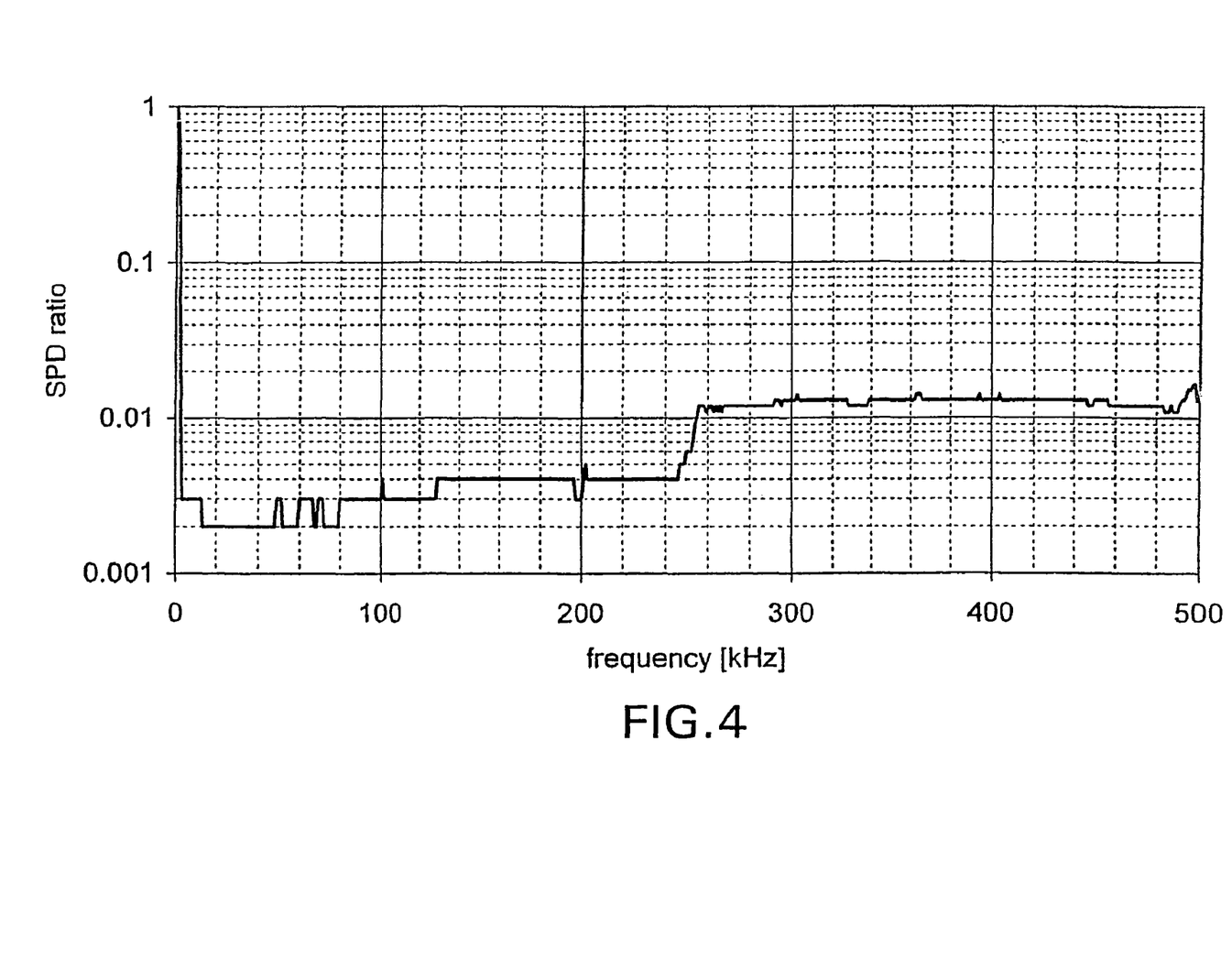
FIGS. 4-5 are plots of SPD ratio versus frequency in tests of the present invention.

FIG. 4 shows the SPD ratio measurement for the 125 kHz to 250 kHz scan. Note the flat plateau at a level of about 1.3% from 250 kHz to 500 kHz showing the power frequency components at double the current or voltage frequencies. Note also the presence of a 0.4% level from 125 kHz to 250 kHz owing to asymmetries in the plasma as described above. Clearly, the wide scan technique is doing a good job of reducing the spectral content at any one frequency down to nearly 1%. This level has been shown to be a reasonable level to avoid acoustic interference.

Figure 5:
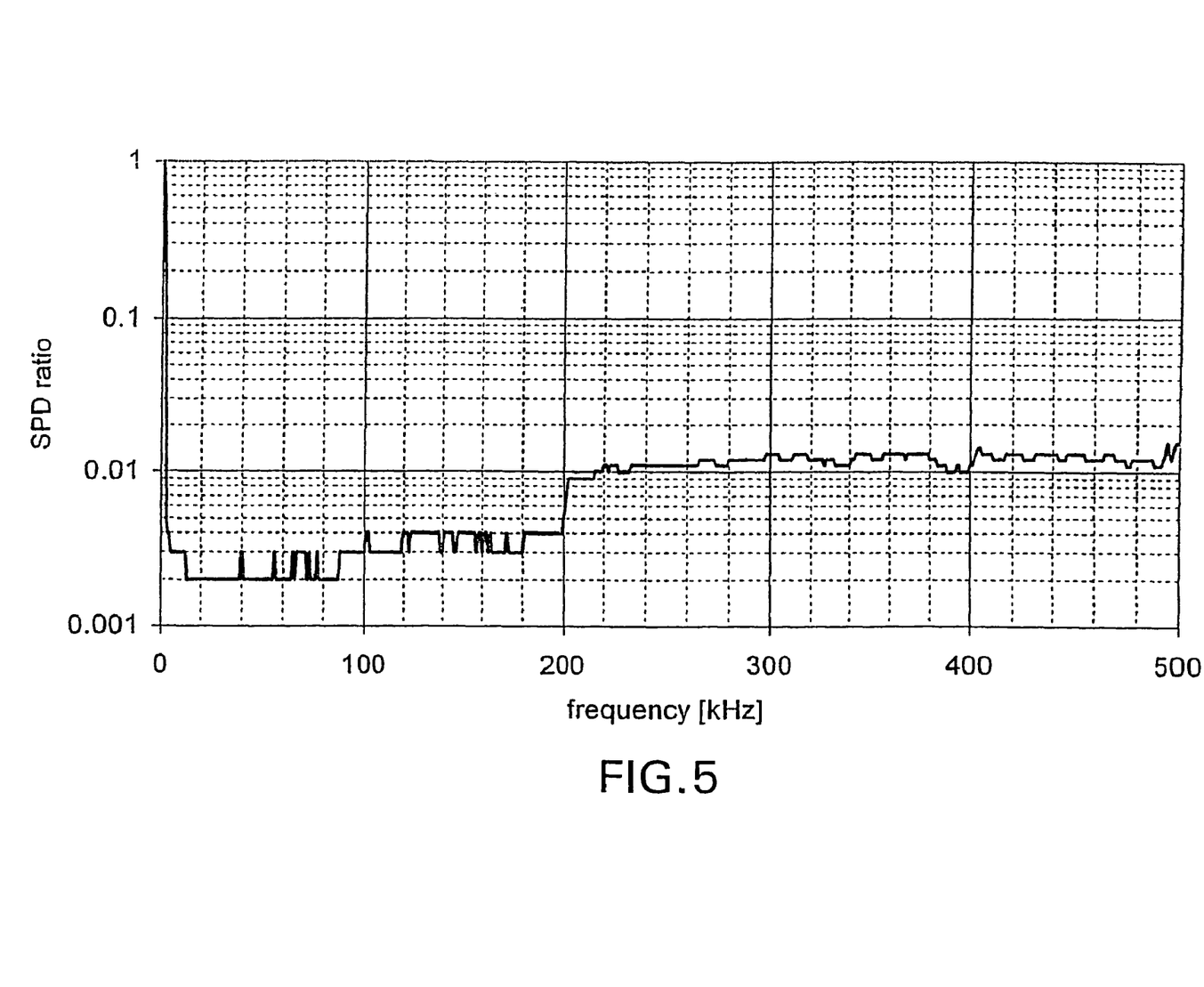

FIG. 5 shows the SPD ratio for the 100 kHz to 250 kHz scan which induced instabilities in the two PAR 30 lamps. The plateau is again at twice the current or voltage frequencies as in FIG. 4—here spanning the range from 200 kHz to 500 kHz at a level of about 1.3%. Apparently, there is a resonance in the 200 kHz to 250 kHz region that is especially sensitive to excitation.

Figure 2C:
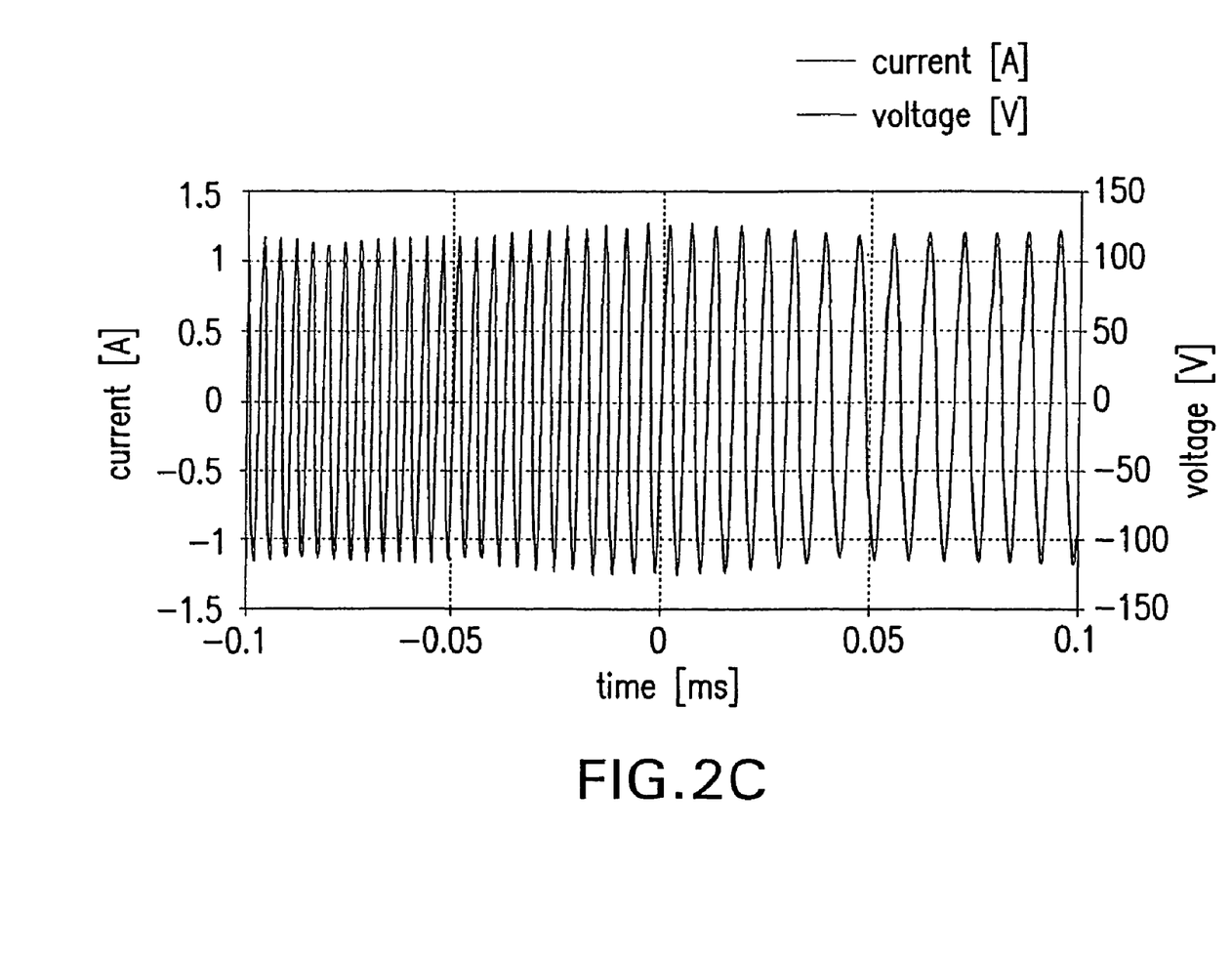

FIG. 6 shows an embodiment of a device 10 for sweeping HF power in an HID lamp. The capacitor 16 coupling between the function generator 12 and the power amplifier 14 serves to diminish the amplitude at the low frequency end of the sweep to compensate for a drop in amplifier and coupling gain at the high frequency end. The result, as can be seen in FIGS. 2A-C, is fairly constant power supplied to the lamp versus frequency. The variable gain matching transformer 18 provides high voltage during starting and reasonable impedance matching to the amplifier output when the lamp warms up. The transformer 18 has multiple output taps that are selected by a switch that insures a continuous current conduction path when it is being switched to avoid extinguishing the arc. The turns ratio may be set to 4 for starting and deceased to about 2.1 for operating. Similarly, the function generator 12 used to control the sweep frequencies and amplitudes produces continuous output while making-adjustments, unlike some more modern devices. An experimental setup included an IEC™ F34 function generator and an ENI™ 1140LA power amplifier.

In another embodiment, an amplitude of the frequency modulated output signal is changed during at least one of the high and low frequency modulations, preferably during the low frequency modulation, so that a current amplitude of the frequency modulated output signal is substantially constant. The power amplifier 14 provides this function. A voltage of the frequency modulated output signal may be adjusted during starting of the lamp, for example by the variable gain transformer 18.

While embodiments of the present invention have been described in the foregoing specification and drawings, it is to be understood that the present invention is defined by the following claims when read in light of the specification and drawings.

We claim:

1. An electronic control gear (ECG) for a high intensity discharge (HID) lamp, comprising:
    a function generator that receives an input signal, wherein the input signal operates the lamp, wherein the function generator frequency modulates the input signal, generating a frequency modulated output signal that drives an arc of the lamp, wherein the frequency modulation of the input signal by the function generator sweeps continuously between a low frequency modulation and a high frequency modulation, the low frequency modulation being a frequency f1 in a range of about 125 kHz to 150 kHz and the high frequency modulation being a frequency f2 in a range of about 230 kHz to 300 kHz, where f2 minus f1 is at least 0.4 times f1; and
    a variable gain transformer that adjusts a voltage of the frequency modulated output signal during starting of the lamp.

2. The ECG of claim 1, wherein a frequency of the frequency modulation changes substantially linearly between the low frequency modulation and the high frequency modulation.

3. The ECG of claim 1, wherein a sweep time from the low frequency modulation to the high frequency modulation and back to the low frequency modulation is about 2-20 ms.

4. The ECG of claim 1, further comprising a power amplifier that receives the frequency modulated output signal from said function generator and changes an amplitude of the frequency modulated output signal during the low frequency modulations so that a current amplitude of the frequency modulated output signal is substantially constant.

5. A method of operating a high intensity discharge (HID) lamp, the method comprising:
    frequency modulating an input signal, wherein the input signal operates the lamp, to generate a frequency modulated output signal, wherein the frequency modulation of the input signal sweeps continuously between a low frequency modulation and a high frequency modulation, the low frequency modulation being a frequency f1 in a range of about 125 kHz to 150 kHz and the high frequency modulation being a frequency f2 in a range of about 230 kHz to 300 kHz, where f2 minus f1 is at least 0.4 times f1;
    driving an arc of the lamp with the frequency modulated output signal; and
    adjusting a voltage of the frequency modulated output signal during starting of the lamp.

6. The method of claim 5, further comprising changing an amplitude of the frequency modulated output signal during at least one of the high and low frequency modulations so that a current amplitude of the frequency modulated output signal is substantially constant.

7. The method of claim 5, wherein a sweep time from the low frequency modulation to the high frequency modulation and back to the low frequency modulation is about 2-20 ms.

8. The method of claim 5, wherein a frequency of the frequency modulation changes substantially linearly between the low frequency modulation and the high frequency modulation so that the frequency of the frequency modulation has a generally triangular pattern.

9. The method of claim 5, wherein the triangular pattern is symmetric.

10. The method of claim 5, wherein the triangular pattern is asymmetric.

* * * * *